United States Patent Office 3,208,344
Patented Sept. 28, 1965

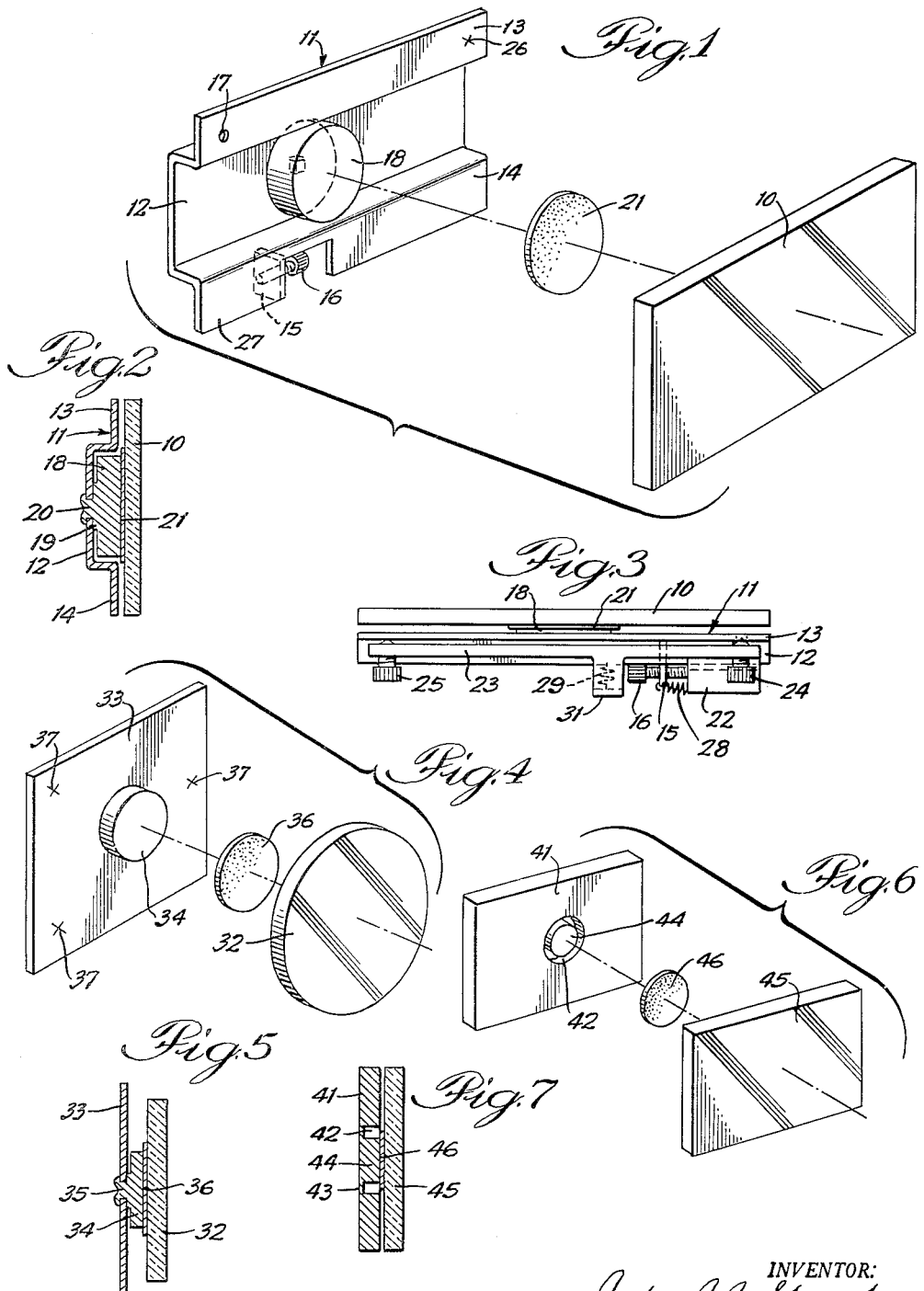

3,208,344
MOUNTING FOR DEFORMABLE
OPTICAL ELEMENTS
John J. J. Staunton, Oak Park, Ill., assignor, by mesne assignments, to Coleman Instruments Corporation, Maywood, Ill., a corporation of Delaware
Filed Jan. 9, 1961, Ser. No. 81,496
5 Claims. (Cl. 88—96)

This invention relates to a mounting for optical elements and more particularly to mounting of mirrors, diffraction gratings and similar elements in spectrophotometers and like instruments.

In mounting of optical elements, such as mirrors and gratings, in spectrophotometers and similar instruments, it is necessary that the elements be so mounted that their refractive surfaces will not be damaged and so that there is no possibility of warping thereof due to temperature changes or to mechanical adjustments of the mountings. It is also highly desirable to avoid the intrusion of any clamping or framing means into the optical planes of the elements which would have a tendency to scatter radiations reaching the elements.

It is accordingly one of the objects of the present invention to provide a mounting for optical elements which satisfies all of these requirements and which is at the same time relatively simple and compact.

Another object is to provide a mounting in which optical elements are accurately and securely supported from one side only thereof so that there are no constraints thereon tending to produce warping.

Still another object is to provide a mounting in which an optical element is supported on the surface of a relatively rigid disc which is in turn connected through a portion of reduced section to a mounting plate. In one desirable construction the disc is mounted on the mounting plate through a reduced stem projecting from a reduced diameter bearing section of the disc so that any strains set up in the mounting plate due to adjusting pressures thereon will not be transmitted to the optical element. In another desirable construction the disc may be formed by cutting an annular groove partially through the mounting plate itself.

According to a feature of the invention, the disc is formed of stainless steel and the optical element is formed of glass whose coefficients of thermal expansion are approximately the same so that strain in the optical element due to temperature changes is minimized.

According to another feature of the invention the optical element is supported on the disc through a thin sheet or disc of yielding material which will absorb any minor strains due to difference in thermal expansion tending to be transmitted from the mounting disc to the optical element.

A further object is to provide a mounting for optical elements in which the mounting plate is supported for adjustment in a very simple construction and which provides a highly accurate universal adjustability of the elements.

The above and other objects and features of the invention will be more readily apparent from the following description when read in connection with the accompanying drawing, in which:

FIGURE 1 is a perspective partially disassembled view of a mounting for a diffraction grating embodying the invention;

FIGURE 2 is a section through the assembled grating of FIGURE 1;

FIGURE 3 is a top plan view showing the mounting and adjustment of the mounting plate;

FIGURE 4 is a view similar to FIGURE 1 showing a mounting for a circular mirror;

FIGURE 5 is a section through the assembled mirror and mounting of FIGURE 4;

FIGURE 6 is a view similar to FIGURE 1 showing a further alternative construction; and FIGURE 7 is a transverse section through the construction of FIGURE 6.

The mounting of FIGURES 1 to 3 is intended to support a diffraction grating, indicated generally at 10, which preferably has a glass backing supporting a grating on its outer surface which is blazed in any desired manner. The grating is adapted to be supported on an adjustable support or mounting plate, indicated generally at 11, which may be formed of any desired type of sheet metal, such as stainless steel. As shown, the mounting plate has a channel section central portion 12 with coplanar side flanges 13 and 14 so that it is relatively strong and stiff without being heavy or cumbersome. A flap 15 is bent out of the lower flange 14 and has an adjusting screw threaded therethrough for a purpose to appear more fully hereinafter. The plate is supported through a pivot opening 17 in the upper flange 13 near one end of the mounting plate, as described later.

A supporting disc or plug 18, preferably of martensitic stainless steel, or of similar metallic or non-metallic material having a thermal coefficient of expansion approximating that of the glass grating back, is secured to the mounting plate and is of a size to fit within the channel portion thereof and to project slightly beyond the plane of the flanges 13 and 14, as best seen in FIGURE 2. For securing the disc in place, it is provided with a reduced diameter projection 19 and with a stem 20 of small size relative to the plate diameter which projects through a complementary opening in the web of the channel portion and is attached by a screw, by cementing or by being riveted over, as seen in FIGURE 2. Preferably, the stem and the opening through which it extends are of non-circular section, such as the square shape shown in FIGURE 1, to prevent turning of the supporting disc relative to the plate.

A relatively thin disc 21, such as neoprene cork composition, is cemented to the outer face of the supporting disc 18 by a suitable cement, such as an epoxy cement. The disc 21 may be a relatively firm material and is made quite thin, on the order of $\frac{1}{32}$ inch, so that it will be rigid for all practical purposes, but will yield to absorb any strains due to thermal expansion of the materials to prevent transmission of such strains from the supporting disc to the grating. Although we have had good results with neoprene cork other materials of similar elasticity and firmness may be used provided that they are cementable, impervious to the cement so as not to be hardened thereby, and are dimensionally stable to a high degree over extended periods of time. The disc 21 should be larger than the supporting disc 18 to insure that no cement can bridge around its edge and nullify the resilience of the mounting. The back surface of the grating is secured to the disc through a similar cement to complete the assembly of the grating to the mounting plate. Preferably, as seen in FIGURE 2, the edges of the grating overlie, but are slightly spaced from the flanges 13 and 14 of the mounting plate, the spacing being on the order of $\frac{1}{16}$ inch so that any distortion of the mounting plate for any cause will not be transmitted to the grating.

The mounting plate is mounted for adjustment, as best seen in FIGURE 3, on a support including a vertically elongated member 22 having an arm 23 extending behind and spaced from the upper flange 13 of the mounting plate. The mounting plate is connected to a piovt 24 which may be an adjustable screw made conical at its end to fit pivotally into the opening 17 in the mounting plate. Instead of being adjustable the pivotal connection could be a fixed connection supporting the upper flange 13 of the mounting plate in spaced relation to the support 22 and the arm 23.

The arm 23 at its outer end and the support 22 at its lower end, not shown, carry pointed or rounded end adjusting screws 25 which are threaded therethrough and which engage the flanges 13 and 14 of the mounting plate at the points 26 and 27, respectively, as shown in FIGURE 1. By adjusting the screws 25 and the similar screw, not shown, at the lower end of the support 22, the angle of the mounting plate may be universally adjusted relative to the support so that the grating can be accurately positioned and focused in the assembly.

For turning the grating angularly, and to align the rulings thereon properly, the screw 16 engages the lower end of the support 22 and a spring 28 is preferably connected between the lug or ear 15 and the support 22 to hold the end of the screw 16 against the support. By adjusting the screw 16, the mounting plate will be turned about the pivot member 24 to adjust the angle of the grating, as desired. Preferably the mounting plate is resiliently urged against the pivot member and the adjusting screws by a spring 29 connected to the rear surface of the mounting plate and to a bracket 31 extending downwardly from the arm 23 and spaced from the back of the mounting plate. This spring 29 is attached to the mounting plate at approximately the centroid of the triangle formed by the pivot member and the adjusting screws.

FIGURES 4 and 5 show a similar mounting for a circular mirror 32 which is to be supported on a mounting plate 33 which may be flat as shown or may have a channel section central portion similar to the plate 11 of FIGURES 1 to 3. A supporting disc 34, similar to the disc or plug 18, is secured to the mounting plate 33 through a reduced stem 35, as best seen in FIGURE 5. Preferably the stem 35 and the opening through which it extends are made non-circular so that the support disc will not rotate.

A thin sheet or disc 36 of yielding material, similar in composition and thickness to the disc 21, is cemented between the face of the supporting disc 34 and the back of the mirror 32 to support the mirror from the mounting plate. It will be seen that in this case, as in the mounting of the grating in FIGURES 1 to 3, the optical element is supported only through the yielding disc and the relatively small supporting disc in spaced relation to the mounting plate so that it cannot be distorted due to temperature changes or to warping of the mounting plate through pressure thereon. The mounting plate 33 may be supported in a manner similar to the mounting plate 11 of FIGURE 1 with adjusting screws adjusting it at the points 37 to adjust it angularly.

FIGURES 6 and 7 illustrate another embodiment of the invention comprising a mounting plate 41 in the form of a flat metal plate which in this instance is relatively thick. To form the supporting disc an annular groove 42 is cut partially through the mounting plate 41 from one surface thereof and, as best seen in FIGURE 7, extends almost, but not completely, through the mounting plate to leave a thin annular web 43 securing the disc 44 defined by the groove to the mounting plate.

An optical element shown as a grating 45 similar to the grating 10 of FIGURE 1 is adapted to be mounted on the disc 44. For this purpose a thin disc 46 of yielding material similar to the discs 21 and 36 described above is cemented to the outer face of the disc 44. As best seen in FIGURE 7 the disc 46 is of a greater diameter than the disc 44 but of a smaller diameter than the outer edge of the groove 42 so that its edge terminates in registry with the groove 42. The grating 45 is cemented to the outer surface of the disc 46 to be supported thereby.

The mounting plate may be adjustably mounted in a manner similar to the mounting of the mounting plates 11 and 33 to support the grating in an instrument. In this construction the parts function in the same manner as the corresponding parts in the preceding figures. The thin annular web 43 secures the disc to the mounting plate but is yieldable in response to stresses created in the mounting plate by adjustments thereof so that these stresses will not be transmitted to the disc 44 or the grating. Similarly, the disc 46 will yield in response to stresses created by differences in thermal expansion between the disc 44 and the grating so that these stresses will not be transmitted to the grating. The disc 46, because of its size, cannot be spanned by cement around its edges so that it will retain its desired resilience.

It will be noted that in all of the embodiments shown, the optical element is supported entirely from the rear surface thereof with no clips or framing members projecting into its optical plane to diffuse light or other radiations directed toward the optical element. Also in each case the optical element is firmly supported against any possibility of warpage due to temperature changes or to mechanical strains imposed on its mounting plate.

While several embodiments of the invention have been shown and described herein, it will be understood that they are illustrative only and not to be taken as a definition of the scope of the invention, reference being had for this purpose to the appended claims.

What is claimed is:

1. A mounting for optical elements comprising a mounting plate, a rigid supporting disc having a portion of reduced section thereon extending therefrom and secured rigidly to the mounting plate and spacing the disc from the mounting plate to minimize transfer of strains from the mounting plate to the disc, a distortable optical element larger in outline than the disc, a thin resilient layer secured to the inner surface of the optical element and to the outer face of the disc by thin non-contiguous layers of adhesive, a fixed support, three spaced points of connection between the mounting plate and the support one of which defines a pivot whose axis is normal to the plane of the plate and two of which are adjustable normal to the plane of the plate, and adjusting means connecting the plate and the support for adjusting the plate angularly about the pivot relative to the support.

2. A mounting for optical elements comprising a mounting plate, a supporting disc having a bearing portion of reduced diameter at one face thereof engaging the mounting plate, a reduced stem projecting from the bearing portion through a complementary opening in the plate and securing the disc to the plate, a thin disc of yielding material of larger size than the supporting disc secured to the other face of the supporting disc and projecting beyond the edge thereof, and an optical element of larger size than the discs secured to and supported by the thin disc.

3. A mounting for optical elements comprising a mounting plate having an annular groove formed in one face thereof and extending partially through its thickness to define within the groove a supporting disc connected to the mounting plate through a ring of reduced section, a thin disc of yielding material secured to the face of the supporting disc and of larger diameter than the supporting disc so that its edge lies in registry with the groove, and an optical element secured to and supported by the thin disc.

4. A mounting for optical elements comprising a mounting plate of channel section with coplanar side flanges, a rigid supporting disc fitting in the channel and having a portion of reduced section extending therefrom and secured to the web of the channel section, the outer face of the disc being parallel and adjacent to the plane of the side flanges, a thin flat disc of yielding material cemented to the outer face of the supporting disc, and a distortable optical element larger in outline than the supporting disc having a flat face cemented to the thin disc and extending over the side flanges in spaced relation thereto, and the thin disc of resilient material being larger in diameter than the supporting disc.

5. A mounting for optical elements comprising a support, a rigid plug smaller in outline than said support and having a flat outer face and a portion of reduced section thereon extending therefrom and secured rigidly to the support to minimize transfer of strains from the support to the plug, a thin disc of resilient material cemented to the outer face of the plug and a deformable optical element larger in outline than said plug and thin resilient disc centrally cemented to said disc, said disc being of larger diameter than said plug.

References Cited by the Examiner

UNITED STATES PATENTS

| | | | |
|---|---|---|---|
| 1,915,178 | 6/33 | Blackburn | 88—1 |
| 2,058,484 | 10/36 | Mihalyi | 88—2.4 |
| 2,081,299 | 5/37 | Hill | 88—76 X |
| 2,168,223 | 8/39 | Lauve. | |
| 2,459,418 | 1/49 | Ellis | 88—1 |
| 2,461,190 | 2/49 | Wolff | 88—97 X |
| 2,649,011 | 8/53 | Black | 88—74 X |
| 2,868,063 | 1/59 | Weiss | 88—14 |
| 2,906,161 | 9/59 | Thompson | 88—74 X |
| 2,909,204 | 10/59 | Somerville | 88—73 X |
| 2,964,903 | 12/60 | Porter et al. | 88—25 X |

JEWELL H. PEDERSEN, *Primary Examiner.*

EMIL G. ANDERSON, *Examiner.*